US007418313B2

(12) United States Patent
Devis et al.

(10) Patent No.: US 7,418,313 B2
(45) Date of Patent: Aug. 26, 2008

(54) OPERATING METHOD FOR A MOTORIZED ROLLER BLIND

(75) Inventors: Frédéric Devis, Les Carroz (FR); Eric Lagarde, Sallanches (FR); Valérie Maistre, Thyez (FR); Shinichi Fujisawa, Chigasaki (JP); Stéphane Girod, La Roche sur Foron (FR); Alain Tranchand, La Balme de Sillingy (FR); Capucine Autret, Marnaz (FR)

(73) Assignee: Somfy SAS, Cluses (FR)

( * ) Notice: Subject to any disclaimer, the term of this patent is extended or adjusted under 35 U.S.C. 154(b) by 65 days.

(21) Appl. No.: 11/270,209

(22) Filed: Nov. 9, 2005

(65) Prior Publication Data

US 2006/0184853 A1 Aug. 17, 2006

(30) Foreign Application Priority Data

Nov. 19, 2004 (FR) .................................. 04 12299

(51) Int. Cl.
*G05D 3/12* (2006.01)
*G05G 5/00* (2006.01)

(52) U.S. Cl. ........................ 700/286; 700/295; 318/626

(58) Field of Classification Search ................. 700/295, 700/286; 318/626, 266, 286, 264, 265
See application file for complete search history.

(56) References Cited

U.S. PATENT DOCUMENTS

| | | | | |
|---|---|---|---|---|
| 4,618,804 | A * | 10/1986 | Iwasaki | 318/16 |
| 4,638,433 | A | 1/1987 | Schindler | |
| 5,278,480 | A | 1/1994 | Murray | |
| 5,760,558 | A * | 6/1998 | Popat | 318/480 |
| 5,909,093 | A * | 6/1999 | van Dinteren et al. | 318/16 |
| 6,048,293 | A * | 4/2000 | Lee | 482/140 |
| 6,085,564 | A * | 7/2000 | Veit et al. | 72/164 |
| 6,215,265 | B1 * | 4/2001 | Wolfer et al. | 318/434 |
| 6,326,751 | B1 * | 12/2001 | Mullet et al. | 318/434 |
| 6,729,071 | B1 * | 5/2004 | Kawanobe et al. | 49/360 |
| 2003/0153307 | A1 | 8/2003 | Study et al. | |
| 2003/0193304 | A1 | 10/2003 | Fitzgibbon | |
| 2003/0210008 | A1 * | 11/2003 | Maistre et al. | 318/468 |

FOREIGN PATENT DOCUMENTS

WO WO 96/39740 12/1996

OTHER PUBLICATIONS

Somfy Systems, Inc., "Altus RTS Motor Programming and Limit Setting Instructions", Feb. 2003. Reference No. 940125A.*

* cited by examiner

*Primary Examiner*—Thomas K Pham
(74) *Attorney, Agent, or Firm*—Frommer Lawrence & Haug LLP; Ronald R. Santucci

(57) ABSTRACT

The method describes the operation of a roller blind including a moving element that can be operated via an actuator and a handheld-type remote control used to set the value of an operating parameter of the system, the value of this parameter being modifiable between two limit values. In this method, after a modification of the setting of the parameter value, an acknowledgement signal is sent, the acknowledgement signals differing according to whether the parameter value is or is not a limit value.

10 Claims, 2 Drawing Sheets

OPERATING METHOD FOR A MOTORIZED ROLLER BLIND

This application claims priority benefits from French Patent Application No. 0412299 filed Nov. 19, 2004.

BACKGROUND OF THE INVENTION

The invention relates to an operating method for a motorized system for closure, privacy, solar protection or screening, comprising a moving element that can be operated via an actuator and a handheld-type remote control used to set the value of an operating parameter of the system, the value of this parameter being modifiable between two limit values. It also relates to a motorized system operating according to this method.

The adjusting of setting parameters required to correctly operate systems for closure, privacy, solar protection or screening, such as, for example, a garage door, a roller blind or an awning, is a recurrent topic associated with the motorization of these systems.

These parameters to be determined are in particular the force applied on an obstacle, the obstacle detection sensitivity and the stress-relieving time.

There are, indeed, very strict standards defining the conditions in which the system must be able to detect an obstacle and react accordingly. Also, it is important to protect the closure system against repeated mechanical stresses.

DESCRIPTION OF THE PRIOR ART

Different methods for adjusting some of these parameters are known from the prior art.

U.S. Pat. No. 4,638,433, the content of which is incorporated by reference, describes, in its introductory part dealing with the known prior art, a motorized garage door system provided with manual means of adjusting the forces developed by the motor to move the door. A drawback of this system is obviously the risk of error which can lead to dangerous operating conditions, not safeguarding a person who happens to be stuck under the door on a closing movement. To overcome this problem, the patent proposes an automatic method of determining, in a learning mode, the maximum forces that will be developed by the motor in the control mode of the door system. According to this method, a complete opening and closing cycle of the garage door is performed. During this cycle, the forces needed to move the door are measured and the maximum forces that can be developed subsequently by the motor are deduced from the latter, for example by fixing the maximum forces as being equal to the forces needed to move the door plus 10%.

In patent application WO 96/39740, the content of which is incorporated by reference, the parameter setting method described differs from the method described in the above-mentioned patent in that a learning cycle is carried out semi-automatically. A maximum force threshold that can be developed by the motor is first set to a relatively low level. If, during the learning cycle, the forces needed to drive the door are locally greater than the threshold, this threshold is incremented to a greater value. This ensures that the force threshold value stored at the end of the learning procedure can drive the door over its entire travel in the absence of obstacles. The force threshold is not modified again unless a new learning cycle is carried out.

U.S. Pat. No. 5,278,480, the content of which is incorporated by reference, describes methods for adjusting force and sensitivity levels for a motorized garage door. These adjustments are not limited to the learning mode, but can still be carried out in control mode.

Finally, U.S. patent application Ser. No. 2003/0193304, the content of which is incorporated by reference, describes a method of determining threshold values for garage door operating parameters. Following a learning phase of this method, in which parameter threshold values are established, the user can modify the values of these parameters using a user interface. The system and the method that are the subjects of the application present drawbacks. On the one hand, when this interface is implemented on a handheld remote control, it significantly increases the size of the latter. Also, when the user has used the interface to modify a parameter, it is not easy for him to check that this parameter has actually been modified.

SUMMARY OF THE INVENTION

The object of the invention is to provide an operating method for a system which overcomes the abovementioned drawbacks and improves the methods known from the prior art. In particular, the method according to the invention enables parameter values to be modified via a handheld remote control with, for example, only three or four buttons. The operating method according to the invention also enables the user or the installer to be informed, using simple means, as to the settings that have just been made.

In the operating method according to the invention once the setting of the parameter value has been modified, an acknowledgement signal is sent, the acknowledgement signals differing according to whether the parameter value is or is not a limit value.

Various modes of execution of the method are defined by dependent claims 2 to 9.

The motorized system for closure, privacy, solar protection or screening according to the invention comprises a moving element that can be operated via an actuator and a handheld-type remote control used to set the value of an operating parameter of the system, the value of this parameter being modifiable between two limit values. The system comprises hardware and software means for implementing the method defined previously.

The appended drawing shows, by way of examples, an embodiment of a system according to the invention and a mode of execution of the operating method according to the invention.

DESCRIPTION OF THE PREFERRED EMBODIMENTS

Figure 1:
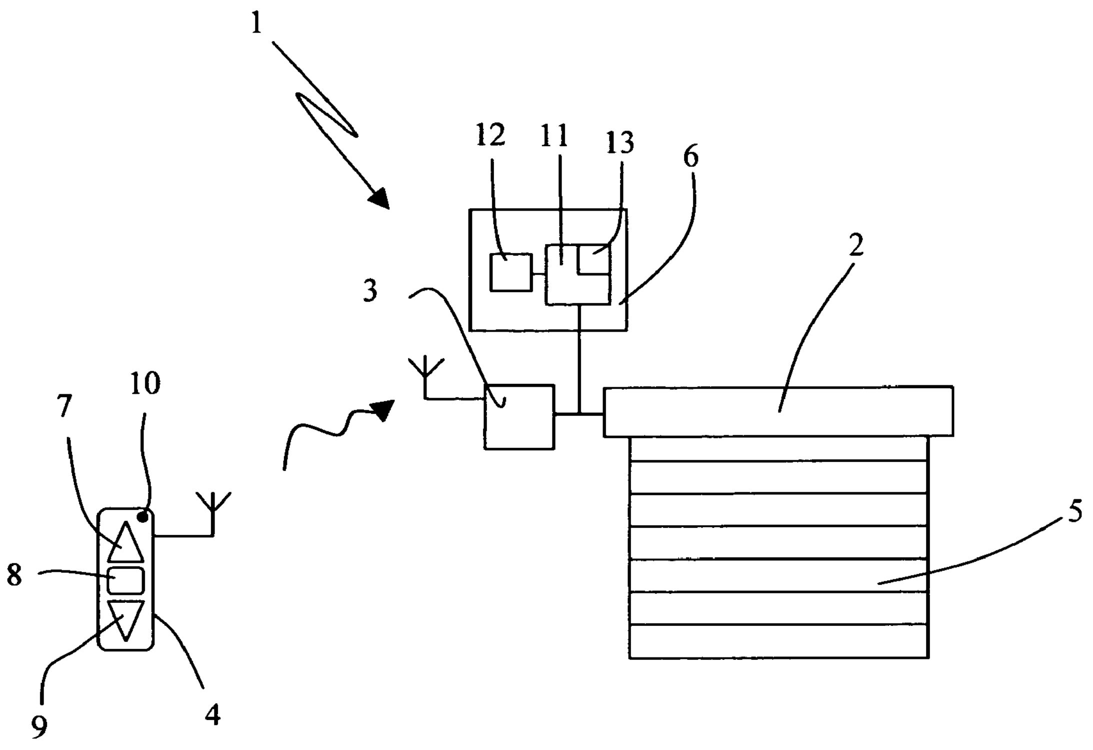
FIG. 1 is a diagram of an embodiment of the system according to the invention.

The motorized screen system 1 shown in FIG. 1 mainly comprises a moving element 5 such as a roller blind, driven by an actuator 2. The actuator 2 is linked to an instruction receiver 3 communicating with one or more control instruction transmitters 4 via wireless links. An electronic management unit 6 of the actuator 2 is linked to or incorporated in the latter.

The various instruction transmitters are designed to send instructions following actions performed manually by the user on the latter, via a control interface. These instructions are received by the instruction receiver 3 and routed to the electronic management unit 6 which controls the actuator 2 accordingly. The electronic management unit includes a processing logic unit 11 provided with a counter 13 and linked to a memory 12.

The actuator 2 is linked to an electrical power source (not shown). The instruction transmitter 4 is of handheld type and is consequently powered by an internal, battery or storage cell type electrical power source.

The main advantage of wireless communication between the instruction transmitter 4 and the instruction receiver 3 is obviously to facilitate the installation of such a motorized screen system 1. It also involves having to pair the or each instruction transmitter 4 with the instruction receiver 3.

The instruction transmitter 4 includes an up control button 7 controlling the winding of the moving element 5, a down control button 9 controlling the unwinding of the moving element 5 and a stop control button 8 controlling the stopping of the movement of the moving element 5. It also includes a programming button 10, the activation of which is less easy to implement than that of a control button. For example, the programming button needs to be pressed with a fine point, for example the point of a pen. This button can be placed on the back of the instruction transmitter.

Pressing this button for a predetermined time causes an instruction to be transmitted to switch the system to a programming mode.

In this mode, the installer or the user defines the rotation directions of the actuator 2 associated with the presses on the control buttons 7 and 9, the end-of-travel positions of the moving element. It also sets certain operating parameters of the system via the instruction transmitter 4.

In principle, in roller blind systems, one or more detection means are fitted, to detect the actual position of the moving element, its speed of movement and/or the mechanical torque developed by the actuator. In the latter case, a maximum torque threshold value is stored in the actuator either in the factory or on installation. In the control mode, if this threshold value is exceeded by the motor torque developed by the actuator to drive the moving element, the actuator is automatically stopped. In the case where the actuator includes an alternating current motor with phase-shift capacitor, the torque developed by the motor can be determined by measuring the voltage value at the terminals of the phase-shift capacitor.

The detection means are, for example, incorporated in the electronic management unit 6, as are the memories 12 needed to store the operating parameters such as the maximum torque threshold value.

In the systems for closure, privacy, solar protection or screening, various settings must be made before use to ensure satisfactory operation.

These various settings are mainly the stored end-of-travel positions, the stored actuator rotation directions for the opening and closing movements of the moving element, the stored sensitivity values and the stored stress-relieving times.

These sensitivity and stress-relieving time settings differ from the other settings in that, during the latter, the installer assigns the system values from ranges normally comprising more than three values that are not associated with any visual indication (enabling the installer to deduce the parameter value).

Sensitivity is a parameter for controlling the stopping of the actuator when the moving element reaches the end of travel or when it comes into contact with an obstacle. This stopping can be triggered if the driving torque developed by the actuator exceeds a threshold. This stopping can also be triggered if the variation of the driving torque developed by the actuator exceeds a threshold. Stopping can also be triggered by a logical or mathematical combination of the overshooting of a threshold by the torque or by the variation of the driving torque developed by the actuator. The threshold values can be pre-stored.

Stress-relieving time is a parameter for mechanically sparing the devices of the kinematic chain transmitting the movement from the motor of the actuator to the moving element. In some systems, the fact that the moving element has reached the end of travel is detected by an increase in the driving torque and when the actuator power supply is cut off, a brake disables the transmission chain to avoid any subsequent movement of the moving element. The result of this is that the stresses generated in the kinematic transmission chain are maintained. This problem is commonly avoided by ordering a brake release phase, the duration of which is called stress-relieving time. During this phase, the motor no longer exerts any force on the devices of the kinematic transmission chain and those of the latter that have been worked release their stresses. The optimum stress-relieving time can vary substantially from one system to another.

A default stress-relieving time value can be pre-stored in the device. This value can be arbitrarily set at 70 ms.

In theory, a stress-relieving phase is applied both after the moving element reaches the top position and after the moving element reaches the bottom position.

These parameters can be set in a simple and practical way for the installer, while ensuring operational safety via the handheld remote control (instruction transmitter 4).

The values of the parameters can be adjusted in a programming mode, following the learning in particular of the end-of-travel positions, any intermediate positions and, if appropriate, an automatic determination of force curve applied between the end-of-travel positions.

The end-of-travel positions can be determined by conventional means. They can, for example:

- be determined automatically (by detecting overload when the moving element has end-stops which come into contact with an element of the opening to be covered, for example),
- be determined semi-automatically (one of the two ends-of-travel is determined automatically, the other is stored by the installer), or
- be determined manually (both ends-of-travel are stored manually by the installer, either mechanically or electronically).

The force characteristic can be determined semi-automatically or automatically, as described in the abovementioned patent applications or patents, or, in a similar manner, in the programming mode.

The setting range for the value of a parameter, of sensitivity or stress-relieving time type, can be determined from values learnt in phases carried out previously in the programming mode or given arbitrarily according to the type of system.

Preferably, the setting range is made up of a finite number of possible values. The minimum value is incremented to the maximum value by increment levels. Preferably, the default value of the parameter to be adjusted is the value of the range (normally the maximum or minimum value) giving the safest operation of the system (from the point of view of protection of life and property). The selected parameter adjustment therefore consists of an offset relative to the current parameter level.

Figure 4:
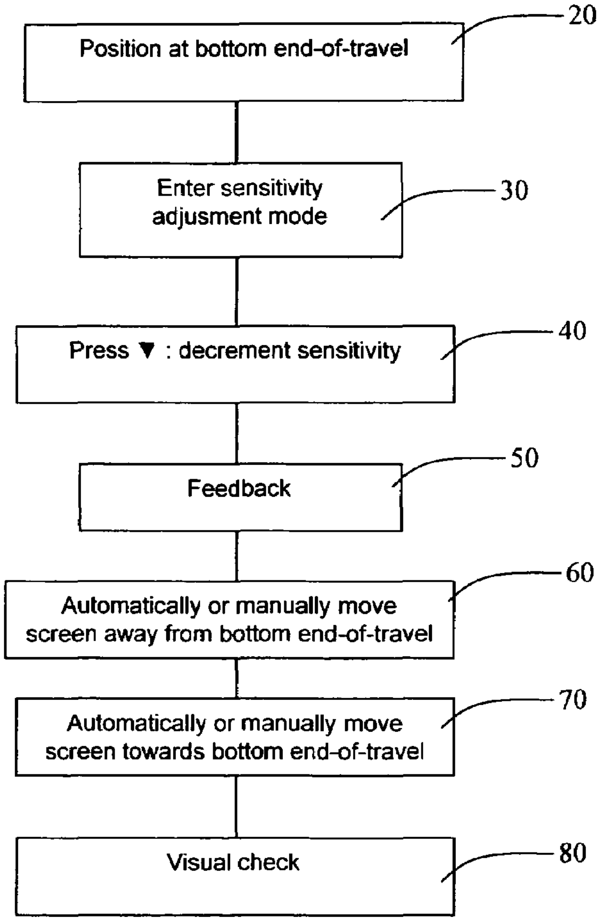
FIG. 4 is a flow diagram of a parameter setting procedure performed according to a mode of execution of the operating method according to the invention.

Setting Sensitivity:

The description of how to set sensitivity value is given with reference to FIG. 4.

A press on the programming button 10 of the instruction transmitter switches the system from the control mode to the programming mode. In a step 30, a particular routine of simultaneous presses on a set of buttons of the instruction transmitter or sequential presses on different buttons of the instruction transmitter is used, in the programming mode, to enter into a sensitivity setting phase.

In this setting phase, the sensitivity threshold value can be incremented by a given interval, or decremented by a given interval, by pressing the button 7, or the button 9. In a step 40, after each press, a signal modifying the sensitivity value is sent to the electronic unit 6. The current sensitivity value is modified according to this signal. In a step 50, after modification, an acknowledgement of the modifying signal is sent. This signal can, for example, include a movement of the moving element.

The acknowledgement signal differs according to whether the stored sensitivity value is a limit value or an intermediate value of the possible setting range for sensitivity.

Figure 2:
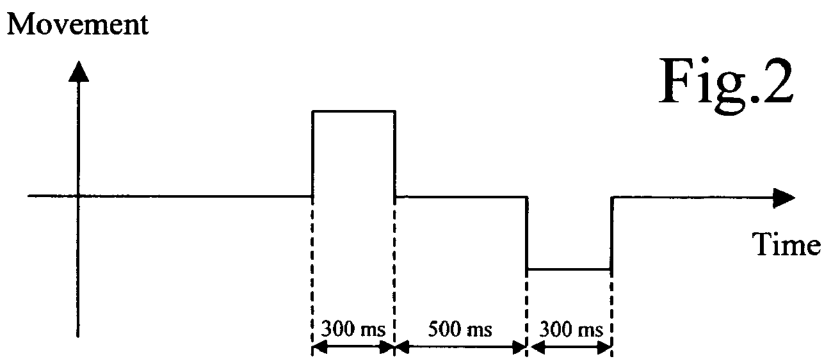
FIGS. 2 and 3 are timing diagrams representing means of informing the user.

For example, as shown in FIG. 2, when the stored sensitivity value is an intermediate value of the setting range, the acknowledgement signal consists of a first movement of the moving element in a first direction for 300 ms, followed by stoppage of the moving element for 500 ms and, finally, a second movement of the moving element in a second direction for 300 ms.

Figure 3:
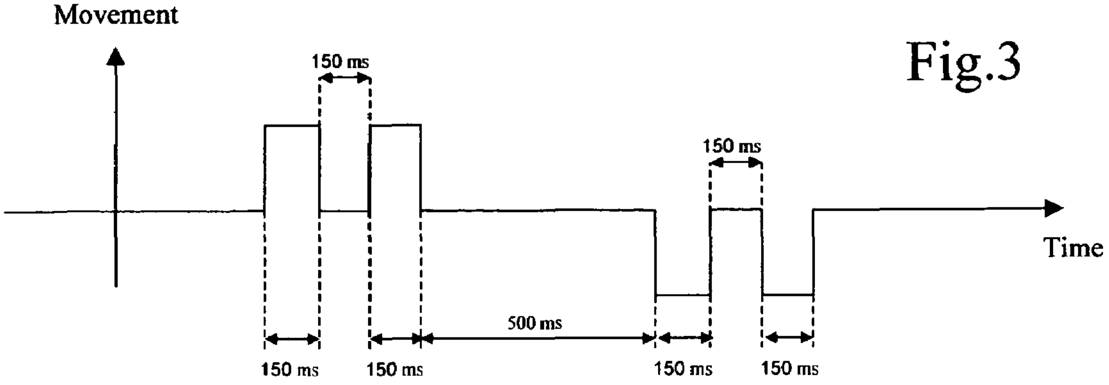

For example, as shown in FIG. 3, when the stored sensitivity value is a limit value of the setting range, the acknowledgement signal consists of a first movement of the moving element in a first direction for 150 ms, followed by a stoppage of the moving element for 150 ms, followed by a second movement of the moving element in the first direction for 150 ms, followed by a stoppage of the moving element for 500 ms, followed by a third movement of the moving element in a second direction for 150 ms, followed by a stoppage of the moving element for 150 ms and ending with a fourth movement of the moving element in the second direction for 150 ms.

Additionally or alternatively, particularly when reducing the sensitivity value below a default value, it can be arranged for one or more movements of the moving element (carried out automatically or provoked by the installer) to bring the latter to an end-of-travel position in order to test the chosen sensitivity value. Thus, the installer receives feedback on the change of sensitivity value and can visually check the effect of the chosen sensitivity value.

In this case, in a step 20 prior to the step 30, the moving element is brought to a bottom end-of-travel position. In a step 60, after the step 50, the moving element is, if necessary, moved away from its bottom end-of-travel position, then in a step 70, the latter is moved to the bottom end-of-travel position so that, in a step 80, the installer can visually assess the effect of the modification of the sensitivity value on the stopping of the moving element at the bottom end-of-travel.

Once the sensitivity value has been chosen, the latter is confirmed and stored by a routine of presses on the control buttons of the instruction transmitter 4 (for example, by pressing the button 8 for longer than 2 seconds). After this press, a signal storing the sensitivity value is sent to the electronic unit 6.

This operation can be followed by a new acknowledgement signal confirming, if necessary, both the storing of the value and the exit from the sensitivity setting phase.

Setting the Stress-relieving Time:

A press on the programming button of the instruction transmitter switches the device from the control mode to the programming mode. A particular routine of simultaneous presses on a set of buttons of the instruction transmitter or sequential presses on different buttons of the instruction transmitter is used, in the programming mode, to enter into a stress-relieving time setting phase.

In this setting phase, the stress-relieving time value can be incremented by a given interval, or decremented by a given interval, by pressing the button 7, or the button 9. After each press, a signal modifying the stress-relieving time value is sent to the electronic unit 6. The current stress-relieving time value is modified according to this signal. After modification, an acknowledgement of the modification signal is sent. This signal can, for example, include a movement of the moving element.

The acknowledgement signal differs according to whether the stored stress-relieving time value is a limit value or an intermediate value of the possible stress-relieving time setting range.

For example, as shown in FIG. 2, when the stored stress-relieving time value is an intermediate value of the setting range, the acknowledgement signal consists of a first movement of the moving element in a first direction for 300 ms, followed by a stoppage of the moving element for 500 ms and ending with a second movement of the moving element in a second direction for 300 ms.

For example, as shown in FIG. 3, when the stored stress-relieving time value is a limit value of the setting range, the acknowledgement signal consists of a first movement of the moving element in a first direction for 150 ms, followed by a stoppage of the moving element for 150 ms, followed by a second movement of the moving element in the first direction for 150 ms, followed by a stoppage of the moving element for 500 ms, followed by a third movement of the moving element in a second direction for 150 ms, followed by a stoppage of the moving element for 150 ms and ending with a fourth movement of the moving element in the second direction for 150 ms.

The acknowledgement signal could also differ from the sensitivity setting acknowledgement signal.

Additionally or alternatively, particularly if reducing the stress-relieving time below a default value, it can be arranged for one or more movements of the moving element (performed automatically or provoked by the installer) to bring the latter to an end-of-travel position in order to test the chosen stress-relieving time value. Thus, the installer receives feedback on the change of stress-relieving time value and can visually confirm the effect of the chosen stress-relieving time value.

Once the stress-relieving time value has been chosen, the latter is confirmed and stored by a routine of presses on the control buttons of the instruction transmitter 4 (for example, by pressing the button 8 for longer than 2 seconds). After this press, a signal storing the stress-relieving time value is sent to the electronic unit 6.

This operation can be followed by a new acknowledgement signal confirming, if necessary, both the storing of the value and the exit from the stress-relieving time setting phase.

Routines

One or more routines can be implemented to initiate the phases for setting these parameters.

These routines must be complex enough to ensure that they cannot be carried out by chance and yet remain executable.

A first routine can be set up to access a setting menu, in which the various phases for setting the sensitivity value, the stress-relieving time value and, where appropriate, values of other parameters are carried out in turn. Alternatively, a new routine distinguishes each new parameter to be adjusted in this menu.

Another solution is to provide routines specific to each adjustable parameter.

Lastly, a final solution, enabling one and the same routine to be used for different parameters, involves imposing an initial condition, for example the position of the moving element: for example, the stress-relieving time is set when the moving element is in the bottom position, whereas the sensitivity is set when the moving element is in the top position.

Another possibility is to enter into a mode for setting a first setting threshold of the stress-relieving time when the moving element is in the top end-of-travel position, to enter into a mode for setting a second stress-relieving time setting threshold when the moving element is in the bottom end-of-travel position and to enable access to the sensitivity setting mode if the moving element is in any position except the end-of-travel positions. Given that different conditions on the moving element position are set, the particular routine for entering into the setting mode can be the same for setting different parameters.

Preferably, the signals modifying the value of a parameter are in fact instructions to increment or decrement the counter 13 of the electronic management unit 6, the values of the counter being associated with parameter values.

The processing logic unit can also include a digital-analog converter and a comparator, the counter value being applied to the input of the converter and the output of this converter being used as a value to be compared with another value measured in the system such as a voltage reflecting the torque developed by the actuator.

The values of the counter 13 can be used as factors for multiplying an individual value determined, for example, in the programming mode to define a setting interval value.

If a parameter threshold, such as the sensitivity threshold, is defined by the trend of several physical quantities, modifying the threshold value of this parameter can involve modifying several physical quantity values.

If the number of possible values for a parameter is limited, a specific acknowledgement signal can be associated with each value. For example, for a setting range with four values—a minimum value, a lower intermediate value, a higher intermediate value and a maximum value—the acknowledgement signal can include a forward/backward movement to confirm that the parameter value is the minimum value, two forward/backward movements to confirm that the parameter value is the lower intermediate value, three forward/backward movements to confirm that the parameter value is the upper intermediate value and four forward/backward movements to confirm that the parameter value is the maximum value.

Alternatively, the set parameter value can be reflected by a position of the moving element. For example, after a parameter has been set to its minimum value, the moving element is moved to its bottom position, whereas, after this parameter has been set to its maximum value, the moving element is moved to its top position. All the intermediate setting values of the parameter can correspond to intermediate positions of the moving element.

On entering into the setting mode linked to a parameter, the moving element can be moved automatically to the height representative of the parameter value stored in memory. Setting the parameter value then causes the moving element to be moved from this reference position. Preferably, the moving element is moved from the reference position in the one or the other direction intuitively corresponding to an increase or decrease in the parameter value.

The routine for setting the threshold could, in these various cases, be directly indicated by a series of presses on one of the control buttons 7, 9 within a given time.

It should be noted that the acknowledgement signal can also be transmitted by radiofrequency waves from the instruction receiver 3 to the handheld remote control 4 and that the latter can, for example, have a light-emitting diode informing the user or the installer. In this case, blinking of the diode can be generated to replace movements of the moving element. The threshold value can also be displayed on a screen replacing the diode.

For a new setting, the threshold value can be reset to its initial level before any setting or can retain its current value: in the latter case, the installer simply has to increase or reduce the current value used according to observation of the system and the consequential setting requirement.

Such an operating method is well suited to a roller blind system. In practice, unlike garage doors, the load as seen by the actuator of a roller blind is not constant according to the movement. A way of setting operating parameters that does not require an additional interface and remains accessible to an installer or a user is in this case particularly useful.

The invention claimed is:

1. Operating method for a motorized system for closure, privacy, solar protection or screening, comprising a moving element that can be operated via an actuator and a handheld-type remote control used to set a value of an operating parameter of the system, the value of this parameter being modifiable between two limit values, wherein, after the setting of the parameter value has been incremented or decremented by presses on buttons of the remote control, an acknowledgement signal is sent, wherein the acknowledgement signal reflects whether or not the parameter value is a limit value.

2. The operating method as claimed in claim 1, wherein the parameter can take a finite number of intermediate values between the two limit values and wherein a specific acknowledgement signal is associated with each of the intermediate and limit values.

3. The operating method as claimed in claim 2, wherein an acknowledgement signal reflects a given setting level or a given setting variation.

4. The operating method as claimed in claim 1, wherein the acknowledgement signal includes a movement of the moving element, until a position representative of the parameter value is reached.

5. The operating method as claimed in claim 1, wherein, in a first mode of operation of the system, presses on buttons of the remote control are used to control the movements of the moving element, and wherein, in a second mode of operation of the system, presses on said buttons of the remote control are used to modify the parameter value.

6. The operating method as claimed in claim 5, wherein, in the second mode of operation of the system, presses on said buttons of the remote control cause a counter, the values of which are associated with parameter values, to be incremented or decremented.

7. The operating method as claimed in claim 1, wherein the acknowledgement signals include movements of the moving element.

8. The operating method as claimed in claim 1, wherein the operating parameter is a sensitivity or a duration.

9. The operating method as claimed in claim 1, wherein a modification of the setting of the parameter is accompanied by a movement of the system allowing the set parameter value to be checked.

10. Motorized system for closure, privacy, solar protection or screening, including a moving element that can be operated via an actuator and a handheld-type remote control used to set the value of an operating parameter of the system, the value of this parameter being modifiable between two limit values, which comprises hardware and software means for implementing the method as claimed in claim 1.

* * * * *